(12) United States Patent
Takagi et al.

(10) Patent No.: US 6,415,676 B1
(45) Date of Patent: Jul. 9, 2002

(54) BALL SCREW DEVICE HAVING SPACERS

(75) Inventors: Hirouyki Takagi; Hidemi Horimoto; Soichiro Ohga, all of Nara-ken (JP)

(73) Assignee: Tsubaki Nakashima Co., Ltd., Nara-Ken (JP)

( * ) Notice: Subject to any disclaimer, the term of this patent is extended or adjusted under 35 U.S.C. 154(b) by 0 days.

(21) Appl. No.: 09/694,949

(22) Filed: Oct. 24, 2000

(30) Foreign Application Priority Data

Oct. 26, 1999 (JP) .......................................... 11-303411

(51) Int. Cl.[7] .................................................. F16H 1/24
(52) U.S. Cl. ..................................... 74/424.88; 384/520
(58) Field of Search .................... 74/424.82, 424.83, 74/424.84, 424.85, 424.86, 424.87, 424.88, 424.89, 424.9, 424.91, 424.92, 424.93; 384/13, 43, 45, 49, 51, 470, 520

(56) References Cited

U.S. PATENT DOCUMENTS

| | | | |
|---|---|---|---|
| 4,175,805 A | * 11/1979 | Becker et al. | 384/520 |
| 4,277,117 A | * 7/1981 | George | 384/520 |
| 4,761,820 A | * 8/1988 | Frank et al. | 384/520 |
| 5,927,858 A | * 7/1999 | Agari | 384/45 |
| 6,082,210 A | * 7/2000 | Ise | 74/459 |
| 6,095,009 A | * 8/2000 | Takagi | 74/459 |
| 6,113,274 A | * 9/2000 | Horimoto | 384/43 |
| 6,149,307 A | * 11/2000 | Kamimura et al. | 384/49 |

FOREIGN PATENT DOCUMENTS

| | | | |
|---|---|---|---|
| DE | 39 40 488 A1 | * 6/1991 | F16C/3/035 |
| JP | 47-3455 | 1/1972 | |
| JP | 56-25480 | 6/1981 | |
| JP | 61-283634 | 12/1986 | |
| JP | 178659 | of 1988 | |
| JP | 27408 | of 1993 | |
| JP | 169746 | of 1998 | |

OTHER PUBLICATIONS

Izawa, Minoru, Ball Screw Application Technique First Ed., Kogyo Chosakai Co. Ltd., May 20, 1993, pp. 19–21.

* cited by examiner

Primary Examiner—David A. Bucci
Assistant Examiner—Timothy McAnulty
(74) Attorney, Agent, or Firm—Howson & Howson (57) ABSTRACT

A ball screw device utilizes spacers having concave ball-contacting surfaces with distributed protrusions or dimples. Balls having needle-like recesses may also be used. The spacers are provided in two thicknesses, and the relative numbers of the thinner and thicker spacers are selected in order to ensure retention of the spacers in their proper positions, while providing a small clearance between the balls and spacers to avoid fluctuations or sharp increases in dynamic torque.

9 Claims, 9 Drawing Sheets

BALL SCREW DEVICE HAVING SPACERS

SUMMARY OF THE INVENTION

This invention relates to a ball screw used in various feeding devices, and more particularly to a ball screw having spacers, and to a method for inserting balls and spacers into the ball screw.

Figure 10:
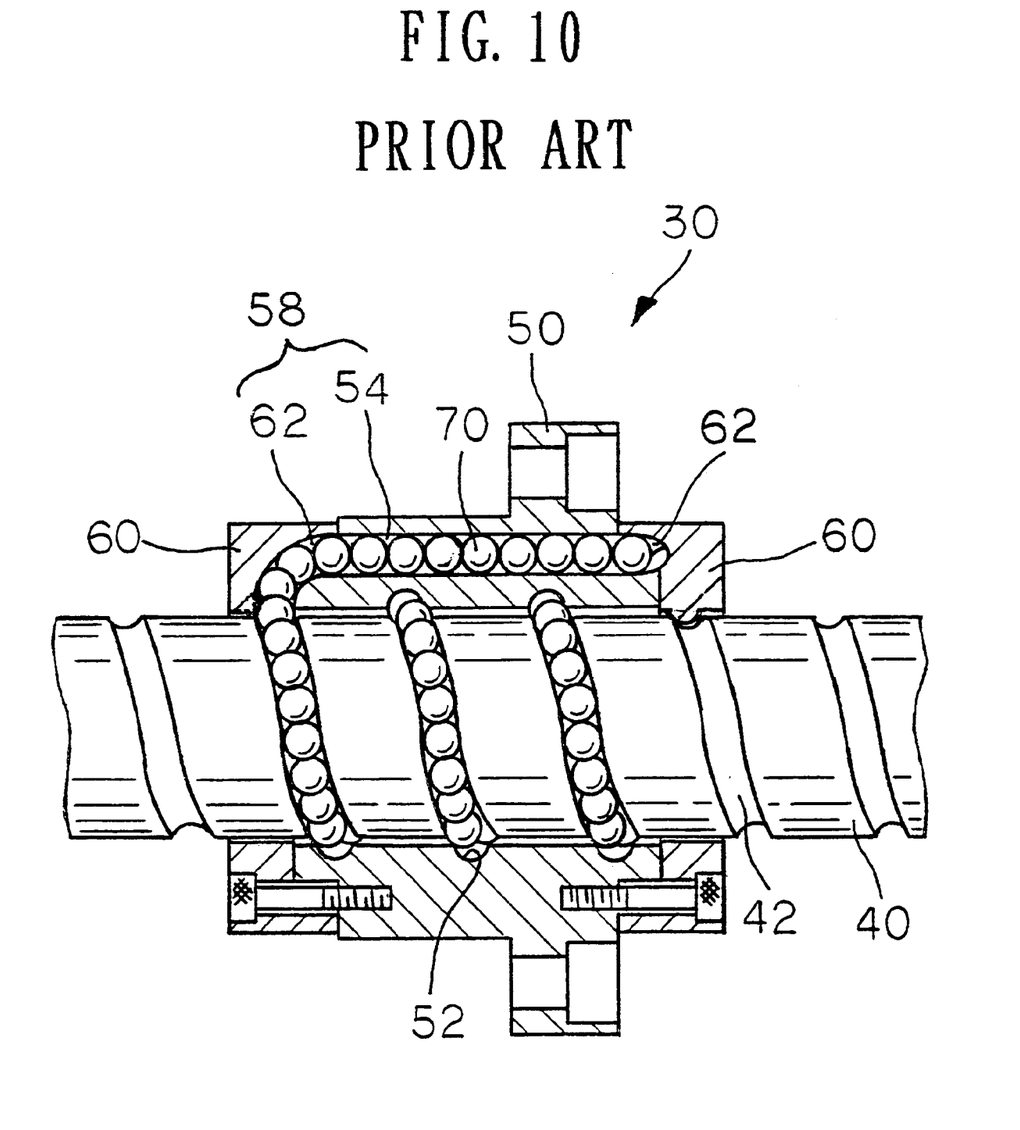
FIG. 10 is a longitudinal cross sectional view of a conventional ball screw device of an end cap system.

A typical known ball screw device comprises a screw shaft having a spiral ball rolling groove on its outer peripheral surface; a ball nut having a spiral ball rolling groove on its inner peripheral surface, the ball rolling groove of the ball nut facing and being opposed to the ball rolling groove of the screw shaft, whereby the ball rolling grooves together form a spiral ball rolling channel having first and second ends; a ball circulating passage connecting said ends of the ball rolling channel; and a plurality of balls in the ball rolling channel and in the ball circulating passage. For example, the ball screw device of FIG. 10, known end-cap system ball screw device, comprises a screw shaft 40 having an outer peripheral surface on which a spiral ball rolling groove 42 is formed, a ball nut 50 having an inner peripheral surface on which a spiral ball rolling groove 52 is formed. The groove 52 is opposed to, and faces, groove 42, forming the spiral ball rolling channel. The ball nut 50 has a thick wall in which an axially extending ball return passage 54 is formed. End caps 60 are mounted on the axial end surfaces of the ball nut, and ball guide grooves 62 in the end caps connect the spiral channel to the ends of the axial ball return passage, the grooves 62 and axial passage 54 thereby forming a ball circulating passage 58. Balls 70 are situated in the channel formed by the opposed grooves, and in the ball circulating passage.

Besides the above-mentioned end-cap ball recirculating scheme, other recirculating schemes have been used, including ball return tubes, barrels and guide plate systems. These are described in Izawa, Minoru, *Ball Screw Application Technique* First Ed., Kogyo Chosakai Co. Ltd., May 20, 1993, pages 19–21.

Most such ball screw devices adopt the "all ball" specification, meaning that the balls are disposed close to one another. The balls which support the load are large in number and hence the ball screw device has a large load-bearing capability and good rigidity. However, because of nonuniformities in the shape of the ball rolling grooves and the like, there are slight differences in the revolving speeds of the balls. In the load region, when the revolving speed of a rear ball is larger than that of a front ball as seen in the advancing direction of the balls, the rear ball bumps into the front ball, these balls jostle each other, and a compressive force is liable to act at the point at which the jostling balls contact each other.

When the compressive force acts at the contact point between two balls, sliding contact acts in a direction to prevent rolling of the balls. Consequently a large resistance is generated, which prevents rotation of the balls, giving rise to fluctuation or a remarkable increase in the dynamic torque of the ball screw device. Furthermore, a ball clogging phenomenon may occur, and sliding contact of the balls also causes problems with the generation of noise (usually expressed by "sound pressure level") and rapid wear of the balls.

The increase in dynamic torque during low speed movement or oscillatory movement is considered to be due primarily to a phenomenon, occurring as a result of sliding contact due to jostling between load-supporting balls, in which the balls cut into the ball rolling groove surfaces.

To alleviate the above-mentioned problems in devices made in accordance with the "all ball" specification, the number of inserted balls is typically made two to four less than the full number of balls that could be inserted. The reduction in the number of balls provides a clearance between balls in the load region, in order to reduce jostling between balls.

In order to reduce fluctuations in dynamic torque, and particularly to reduce the remarkable fluctuations and increase in dynamic torque generated during low speed movement or during repeated reciprocating movement, and to reduce tilting movements occurring during minute feeding, spacer balls are used. The spacer balls have a diameter slightly less (by several tens of $\mu$m) than the diameter of the load bearing balls. When a spacer ball comes into rolling contact with a load-bearing ball, they roll in opposite directions. Accordingly, the sliding contact generated in the case of a ball screw device in accordance with the "all ball" specification is avoided, and the resulting resistance to rolling becomes extremely small, and minimum fluctuation of dynamic torque can be achieved.

Another proposed solution to the aforementioned problems it's the use of a resilient, strip-like retainer which respectively holds balls rotatably in a large number of ball pockets, as depicted in Japanese laid-open utility model publication 27408/1993. The retainer strip is capable of circulating movement.

Similarly, another ball screw device has been proposed in which a resilient ball chain and connector belt are used, as depicted in Japanese laid-open patent publication 169746/1998. The resilient ball chain consists of a large number of balls arranged in line at a given interval, and the connector belt rotatably holds these balls and connects neighboring balls with one another. The ball chain and connector belt are capable of circulating movement.

In both of the last two approaches mentioned above, contact between the balls can be prevented, and consequently fluctuations in dynamic torque can be reduced and ball clogging can be prevented. Moreover, noises due to sliding contact between the balls, and rapid wear of the balls can be prevented.

Still another proposal has been to utilize spacers with spherical concave surfaces on both axial end surfaces thereof. The spacers, which are uniform in thickness are disposed between adjacent balls and portions of the spherical concave surfaces of the balls fit slidably into the concave faces of the spacers, as shown in Japanese laid-open utility model publication 178659/1988. The spacers are all of the same thickness, the term "thickness" referring to the dimension equal to the distance between vertices of the adjacent balls when the adjacent balls are in close contact with the concave surfaces of the spacer between them. In other words, thickness of a spacer is the distance of closest approach of the surfaces of the balls when separated by a spacer.

The ball screw device utilizing spacers avoids point contact between balls, utilizing instead face contact between the balls and the concave surfaces of the spacers. Thus, the high pressure inherent in point contact in the ball screw devices according to the "all ball" or "spacer ball" specifications is avoided. Furthermore, the spacers allow the distance between load-supporting balls to be small compared with devices made according to the "spacer ball" specification, and consequently ball screw devices utilizing spacers generally have a greater load-bearing capability and greater rigidity than those utilizing spacer balls.

The above-described ball screw devices have various drawbacks, which will be described below.

The ball screw device in which the number of balls is from two to four fewer than the number which would fully load the ball rolling channel and ball circulation passage is subject to ball clogging. The ball clogging phenomenon results from the remarkable increase in dynamic torque which is caused by the jostling of the load-supporting balls when the device is subjected to low speed movement or oscillatory movement.

In the ball screw device in accordance with the spacer ball specification, the load capacity and rigidity of the device are reduced as a result of the decrease in the number of load-supporting balls. For example, when the ratio of load supporting balls to spacer balls is 1:1, the basic dynamic rated load indicative of the load capacity is reduced to approximately 60%. Further, since the balls which support the load and the spacer balls are in contact with one another while rolling in opposite directions, the device has a tendency to generate noise and cause wear of the balls due to the contact between the load-bearing balls and the spacer balls.

In the case of the ball screw devices using a strip-like retainer or a ball chain, guiding grooves must be formed in the wall surface of the ball circulating passage, necessitating an additional machining operation and increasing the manufacturing cost.

In addition, the strip-like retainer of ball chain is manufactured after determining its total length preliminarily. However, it is difficult to make the total length of the ball rolling channel and the ball circulating passage equal to the total length of the strip-like retainer or ball chain. Accordingly, when the latter is shorter than the former, a clearance is formed between the leading and trailing ends of the strip-like retainer or ball chain. On the other hand, when the latter is longer than the former, it is impossible to insert the strip-like retainer or ball chain into the ball rolling channel and circulating passage.

When a strip-like retainer or ball chain is wound around the ball screw in the spiral ball rolling channel, it is twisted or bent on an axis extending through the centers of the balls. As a result, when the balls revolve and roll while supporting a load, there is a high probability that breakage will occur due to twisting or bending of the strip-like retainer or ball chain. Also, since the ball circulating passage is bent sharply, there is a possibility that the strip-like retainer or ball chain will break in the ball circulating passage.

In the case of a ball screw device incorporating spacers of uniform thickness between neighboring balls, various other problems arise.

Spacers are manufactured for each model of ball screw device after a preliminary determination of the spacer thickness needed to avoid a clearance between the balls. However, even in the case of a single model of ball screw device, machining errors such as errors in the effective diameters of the ball rolling grooves, and differences in ball diameters, result in irregularities in the total length of the ball rolling channels and ball circulating passages. Accordingly, when the balls and spacers are inserted alternately against one another into the ball rolling channel and the ball circulating passage, a clearance is formed between the ball which is inserted first and the spacer which is inserted last. Depending on the dimension of this clearance, when the screw shaft or ball nut is rotated, the dynamic torque may fluctuate or remarkably increase. In addition, the circulation of the balls may be interrupted due to tilting of the spacers. The use of spacers having a greater thickness will decrease the number of load-bearing balls that can be accommodated in the ball rolling channel, with a resultant decrease in the load-carrying capacity and rigidity of the ball screw device.

Figure 11:
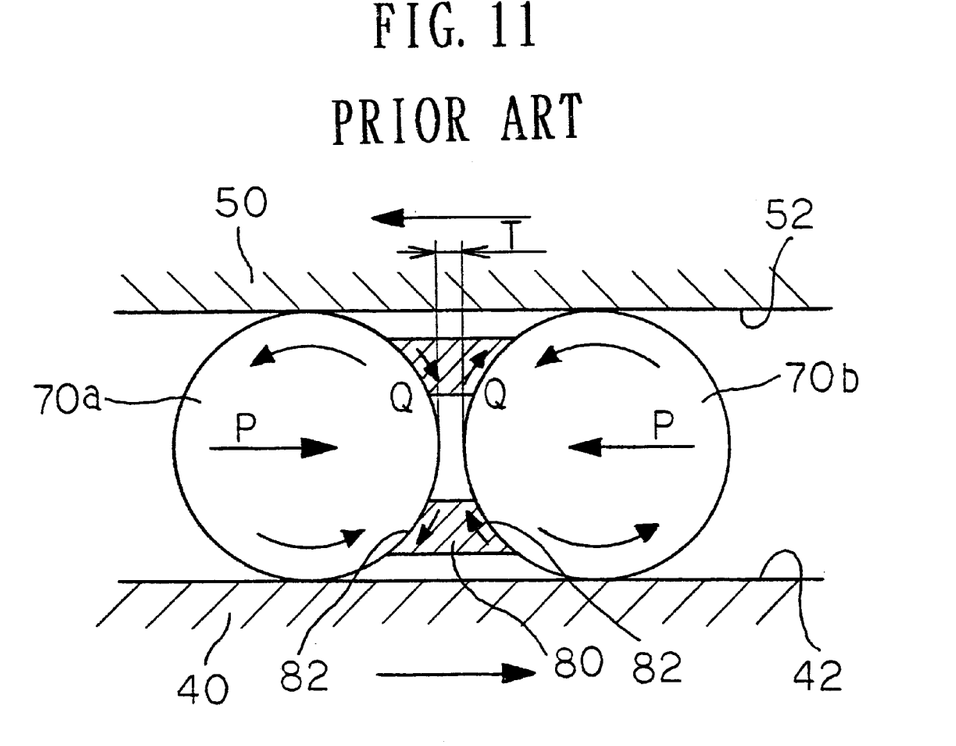
FIG. 11 is a schematic view illustrating drawbacks of a conventional ball screw device having spacers.

As shown schematically in FIG. 11, balls 70a and 70b, which are load supporting balls, move and roll within a load region between ball rolling grooves 42 and 52. Here, as in the case of a ball screw device according to the "all ball" specification, when the revolving speed of the rear ball 70b is greater than the revolving speed of the front ball 70a, the spherical surfaces of the balls come into close contact with concave surfaces 82 of the spacer 80. The balls jostle each other by way of the spacer 80, and the concave surfaces 82 of the spacer are liable to be sandwiched by wide contact areas. Then, when sandwiching forces P act on the concave surfaces 82 of the spacer, a sliding contact is formed over a wide area in a direction to prevent rolling of the balls. Large resistances Q, which obstruct the rolling of the balls 70a and 70b are generated and the dynamic torque of the device is increased.

When the magnitude of the resistances Q becomes equal to or greater than the force needed to roll the balls 70a and 70b, the balls cannot roll and come into sliding contact with grooves 42 and 52. The consequence is that dynamic torque is dramatically increased and ball clogging occurs. The phenomenon of ball clogging is especially likely to occur during low speed movement or when the ball screw device is subjected to tilting.

T indicates the thickness of the spacer 80, which is equal to the distance of closest approach between the balls 70a and 70b when the spherical surfaces of the balls are in close contact with the concave surfaces of the spacer.

The invention addresses the above-discussed problems. In particular, it is an object of the invention to provide a ball screw device having spacers, which makes the balls and spacers circulate smoothly without generating significant fluctuations in, or increasing, the dynamic torque of the device. Another object of the invention is to provide a method for inserting the balls and spacers of such a ball screw device.

A further object of the invention is to provide a ball screw device having spacers, which has a load capacity and rigidity approaching those of a conventional "all ball" device having a number of balls two to four fewer than a full load.

A still further object is to prevent the fluctuation and increase in dynamic torque which tend to occur when both concave surfaces of a spacer are in close contact with, and sandwiched by, neighboring balls, and differences in revolving speeds of the balls occur, caused for example by non-uniformity in the shape of the ball rolling grooves.

To achieve the aforementioned objects, a preferred ball screw device in accordance with the invention comprises a screw shaft having an outer peripheral surface and a spiral ball rolling groove on said outer peripheral surface and a ball nut having an inner peripheral surface and a spiral ball rolling groove on said inner peripheral surface, the ball rolling groove of the ball nut facing and being opposed to the ball rolling groove of the screw shaft, whereby the ball rolling grooves together form a spiral ball rolling channel having first and second ends. A ball circulating passage connects the ends of the ball rolling channel. The device has a plurality of balls in the ball rolling channel and in the ball circulating passage. Spacers are disposed between adjacent balls, each of the spacers having spherical concave end surfaces facing in opposite directions on an axis about which the concave surfaces are symmetrical. The concave end surfaces of each spacer, receive and slidably fit portions of the spherical outer surfaces of two adjacent balls of said plurality of balls, respectively. The improvement comprises discontinuities in the concave surfaces of the spacers. The discontinuities may be constituted by a plurality of protrusions formed on the concave surfaces of said spacers, the protrusions on the concave surface of each spacer being distributed and having ends complementary to the spherical outer surface of the ball received therein. Alternatively, the discontinuities may be constituted by dimples formed in the concave surfaces of said spacers, the dimples in the concave surface of each spacer being distributed.

Preferably the spacers are of two different kinds. The spacers of a first group have a first thickness and the spacers of a second group have a second thickness. The thicknesses of the spacers are such that the distance of closest approach of some adjacent balls to each other is greater than the distance of closest approach of other adjacent balls to each other, and both of said distances are greater than zero.

The thickness T2 of the spacers of the first group is preferably related to the thickness T1 of the spacers of the second group by the formula T2=T1+D/k, where D is the ball diameter, and k is a constant.

The thickness T1 of the spacers of the second group should be such that the closest approach of adjacent balls on opposite sides thereof to each other is in the range of 0.2 to 0.5 mm.

It is preferable that a preload is applied between the balls and both ball rolling grooves.

It is also preferable that the spacers have a column-like or disc-like shape and the diameter of the spacers is in the range of 60% to 80% of the diameter of the balls.

In a preferred embodiment of the invention, the spacers have concave outer peripheral surfaces surrounding an axis extending along the path of the balls through the ball rolling channel and the ball circulating passage.

The spacers are also preferably made of a self-lubricating material, a plastics material containing a lubricant or a plastics material impregnated with a lubricant.

The balls preferably have innumerable, minute, needle-like recesses formed in, and randomly distributed on, their spherical outer surfaces.

A method for inserting balls and spacers into a ball screw device is another aspect of the invention. The method is applicable to a ball screw device comprising a screw shaft having an outer peripheral surface and a spiral ball rolling groove on said outer peripheral surface; a ball nut having an inner peripheral surface and a spiral ball rolling groove on said inner peripheral surface, the ball rolling groove of the ball nut facing and being opposed to the ball rolling groove of the screw shaft, whereby the ball rolling grooves together form a spiral ball rolling channel having first and second ends; a ball circulating passage connecting said ends of the ball rolling channel; a plurality of balls in the ball rolling channel and in the ball circulating passage, the balls having spherical outer surfaces; and spacers disposed between adjacent balls, each of the spacers having spherical concave end surfaces facing in opposite directions on an axis about which the concave surfaces are symmetrical, said concave end surfaces of each spacer, receiving and slidably fitting portions of the spherical outer surfaces of two adjacent balls of said plurality of balls, respectively.

In accordance with the method, the balls and spacers are inserted alternately into the path consisting of the ball rolling channel and the ball circulating passage. When there are no clearances between the successively inserted balls and spacers, the clearance between the ball which is inserted first and the thinnest portion of the spacer which is inserted last is preferably in the range of ⅓ to ½ of the diameter of the balls which are inserted.

The method of the invention is preferably carried out using two groups of spacers, the spacers of a first group having a first thickness and the spacers of a second group having a second thickness. The thicknesses of the spacers should be such that the distance T2 of closest approach of some adjacent balls to each other is greater than the distance T1 of closest approach of other adjacent balls to each other, and both of the distances T2 and T1 are greater than zero.

The thickness T2 of the spacers of the first group is preferably related to the thickness T1 of the spacers of the second group by the formula T2=T1+D/k, where D is the ball diameter, and k is a constant.

In carrying out the insertion method, a number N of balls, a number n1 of spacers of the second group, and a number n2 of spacers of the first group, are inserted into the ball rolling channel and the ball circulation passage, which together have a total length L. The clearance between the ball which is inserted first and the thinnest portion of the spacer which is inserted last has a value C, which is greater than zero. The values D, N, T1, T2, n1 and n2 satisfy the following relationships:

$$L=D\cdot N+T1\cdot n1+T2\cdot n2+(⅓ \text{ to } ½)\cdot D$$

and $$N=n1+n2,$$

and n2 is the integer portion of the following numbers:

in the case in which (⅓ to ½)·D<C, $n2=(C-(⅓ \text{ to } ½)\cdot D)/(T2-T1)$, and in the case in which (⅓ to ½)·D>C, $n2=((C+D+T1)-(⅓ \text{ to } ½)\cdot D)/(T2-T1)$.

Again, in carrying out the method the thickness T1 should be in the range from 0.2 to 0.5 mm, and a preload should be applied between the balls and the ball rolling grooves.

When the clearance between the ball which is inserted first and the thinnest portion of the spacer which is inserted last is in the range of ⅓ to ½ of the diameter of the balls which are inserted, the following advantages are obtained.

First, when the screw shaft or ball nut is rotated, if the revolving speeds of the balls are uniform at the time that they move and roll, the spacers are held so that the spherical surfaces of the neighboring balls and the radially outward portions of the concave surfaces of the spacers are brought into contact with each other while clearances are maintained between the spherical surfaces of the balls and the concave surfaces of the spacers so that fluctuations and increases in dynamic torque are prevented and smooth circulation of the balls and spacers is ensured.

Second, when a lubricant (grease or oil) fills the space between the ball rolling grooves, clearances defined between the spherical surfaces of the balls and the concave surfaces of the spacers form oil pockets enhancing the retention of lubricant.

Third, by disposing spacers between the balls which set the clearance between balls to a dimension in the range from ½ to ⅓ of the ball diameter the number of balls can be within the range of 2 to 4 balls less than the full number of balls that can be loaded. Consequently, the ball screw device of the invention can achieve a load capacity and rigidity similar to those of an "all ball" device.

The protrusions and dimples formed on the concave surfaces of the spacers give rise to the following further advantages.

First, even when both concave surfaces of the spacer are brought into close contact with the spherical surfaces of the balls, and the spacers are sandwiched between balls revolving at different speeds, the resistances that obstruct the rolling of the balls is relatively small, and consequently the dynamic torque neither fluctuates nor increases. By applying a preload between the balls and both ball rolling grooves, a frictional force generated by the preload is added to the force needed to roll the balls, and hence the balls can roll more easily.

Secondly, even when the ball screw device is subjected to low speed movement or oscillatory movement, it is possible to prevent the remarkable increase in dynamic torque and to avoid the resulting ball clogging phenomenon.

Third, when the ball rolling grooves are filled with a lubricant, the spaces defined between the protrusions, or, in the case of dimples, the dimples themselves, function as oil pockets for the lubricant. Hence, the formation of oil films on the spherical surfaces of the balls is not interrupted, and wear of the balls and the ball rolling grooves, caused by point contact between the balls and the grooves, can be prevented.

Since the spacers are not connected to one another, and each spacer is disposed between independent neighboring balls, the following advantages are realized.

First, since the balls to not come into contact with each other, the invention avoids wear and the generation of noise which occur in conventional "all ball" or "spacer ball" devices as a result of contact between adjacent balls.

Second, the invention obviates the extra machining steps needed for example to form recessed guide grooves in the ball circulating passage in strip retainer or ball chain devices. Accordingly, the ball screw device can flexibly cope with individual products including conventional products.

Embodiments of a method for inserting balls and spacers in a ball screw device according to the invention, and a ball screw device produced by the method, are explained in the following detailed description in conjunction with the drawings.

BRIEF DESCRIPTION OF THE DRAWINGS

FIGS. 3(*a*) and 3(*b*) are longitudinal cross-sectional views showing modifications of the outer peripheral surfaces of the spacers of FIGS. 1 and 2, respectively;

DETAILED DESCRIPTION

Since elements other than balls and spacers, such as a screw shaft, a ball nut, and the like, are identical to those of conventional ball screw devices, it is unnecessary to illustrate such elements in detail in the drawings. However, to facilitate understanding of the invention, the screw shaft, the ball nut and their ball rolling grooves are shown schematically in FIG. 10.

Figure 1:
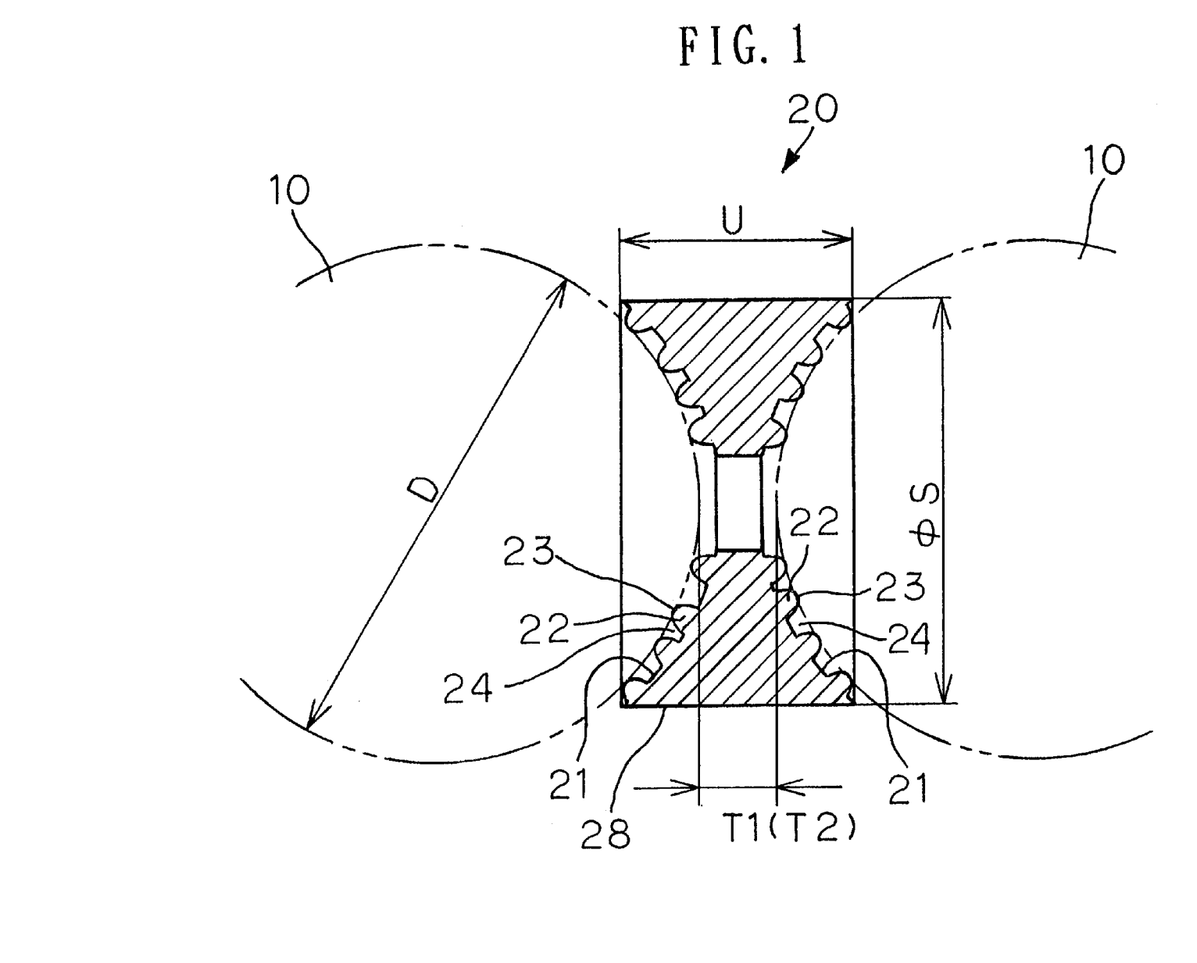
FIG. 1 is a longitudinal cross-sectional view showing a spacer in accordance with a first embodiment of the invention.

Referring first to FIG. 1, a spacer 20, made of plastics or the like has a column-like (or disc-like) shape, and has spherical, concave surfaces 21 on both of its axial ends. These concave surfaces allow portions of the spherical surfaces of balls 10 to fit slidably in the faces of the spacer.

The concave surfaces are provided with a plurality of protrusions 22, the protruding ends 23 of which complementarily trace spherical surfaces of the balls 10. The protrusions are in a distributed state on the concave surfaces of the spacer. Only the protrusions in the plane of the cross-section are shown, but it should be understood that the protrusions are distributed over the concave surfaces of the spacer. The protrusions are formed so that the spherical surfaces of the balls come into point contact with their protruding ends 23. Spaces 24 between the protrusions have an additional advantageous effect in that they function as lubricant pockets for lubricating grease or oil.

The diameter S of the spacer is set to 60 to 80% of the diameter D of the ball 10 in order to achieve stability in the holding of the spacer 20 by balls 10 and in order to achieve smooth circulation of the balls and spacers.

In FIG. 1, the symbol U indicates the axial length of the spacer 20, which is related to, and determined by, the spacer's diameter S and its thickness (T1 or T2), the latter being the distance of closest approach of balls fitted into the concave faces on opposite sides of the spacer. Numeral 28 refers to the outer peripheral surface of the spacer, which is symmetrical about an axis extending through the centers of the two balls on opposite sides of the spacer.

The spacers in a ball screw device in accordance with the invention preferably consist of two kinds, having different thickness T1 and T2, respectively, where T2>T1>0. The reason is as follows.

As mentioned previously, even when ball screw devices have the same nominal model numbers, machining errors can cause variations such as variations in the effective diameters of the ball rolling grooves, variations in the diameters of the balls, and irregularities in the total length of the ball rolling channel (constituted by the opposed grooves in the ball screw and ball nut) and the ball circulating passage. Accordingly, when the balls are inserted alternately with spacers of uniform thickness, when there is no clearance between the balls and spacers, there is a clearance between the first-inserted ball and the last-inserted spacer. Depending on the dimension of this clearance, when the screw shaft or ball nut is rotated, the dynamic torque of the ball screw device may fluctuate or increase remarkably, and the circulation of the balls may be interrupted by tilting of the spacers.

To cope with this drawback, several kinds of spacers, having different thicknesses, can be prepared. However, if the number of different kinds of spacers is 3 or more, the administration of the spacers becomes cumbersome, and it is necessary to provide additional molds for producing the spacers.

The choice of dimensions T1 and T2 of the spacer thickness may be explained as follows. The dimension of the smaller thickness T1 is set to a value in the range of 0.2 to 0.5 mm in order to ensure high load capacity and rigidity by allowing as many balls 10 as possible to be inserted without impairing smooth circulation of the balls and spacers. Preferably the thickness T1 is about 0.2 mm when the ball has a diameter D of 5/32 inch (3.969 mm) and is about 0.5 mm when the ball has a diameter D of 5/8 inch (15.875 mm).

The larger thickness T2 is selected so that the relationship T2≈T1+D/k is satisfied, k being a constant in the formula. Research on ball screw devices of various nominal models numbers whose effective number of turns was 1.5 has revealed that approximately 24 balls having a diameter D (defined for each model) and 24 spacers having a thickness T1 can be inserted into a ball screw device, and the maximum clearance between the first-inserted ball and the last-inserted spacer is the diameter of one ball. This implies that only 24 balls can be inserted. Accordingly, to clog such a clearance having a dimension equal to the diameter of one ball, by substituting spacers 20 having a thickness T2, which satisfied the relationship T2=T1+D/24, 24 such spacers (equal to the number of balls) can be inserted. For example, if the ball diameter D is 1/4 inch (6.35 mm), and the thickness T1 of the thinner spacers is 0.2 mm, the thickness T2 of the thicker spacers becomes 0.2+6.35/24≈0.5 mm.

The constant k will, of course vary depending on the number of effective turns in the device.

Figure 2:
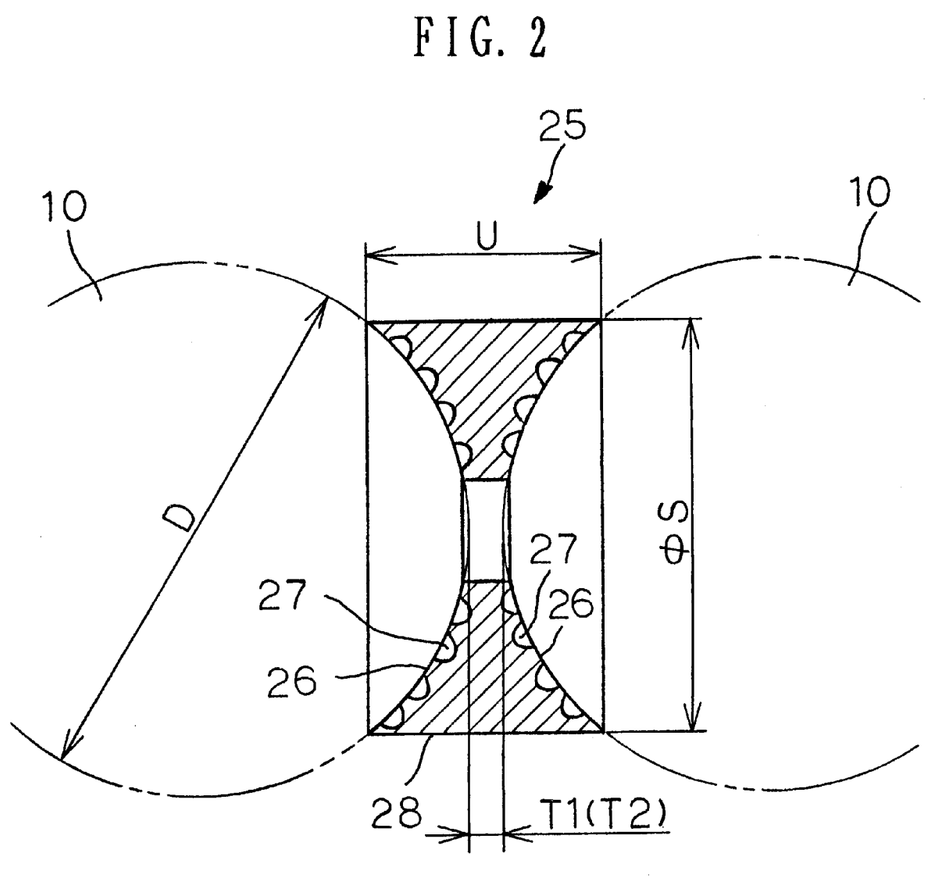
FIG. 2 is a longitudinal cross-sectional view showing a spacer in accordance with a second embodiment of the invention.

In the second embodiment, as shown in FIG. 2, spherical concave surfaces 26 are provided on both axial end faces of a spacer 25, and portions of the spherical surfaces of balls 10 fit into these faces. A plurality of relatively small dimples 27 are formed on the concave surfaces and are distributed over the concave surfaces. (Only the dimples in the plane of the cross-section are shown in FIG. 2.) Because of the dimples, the spherical surfaces of the balls come into contact with, and roll relative to, the concave surfaces 26 over a relatively smaller area. The dimples 27 also have the advantage that they function as lubricant pockets. In other respects, the embodiment of FIG. 2 is similar to the embodiment of FIG. 1.

Figure 3A:
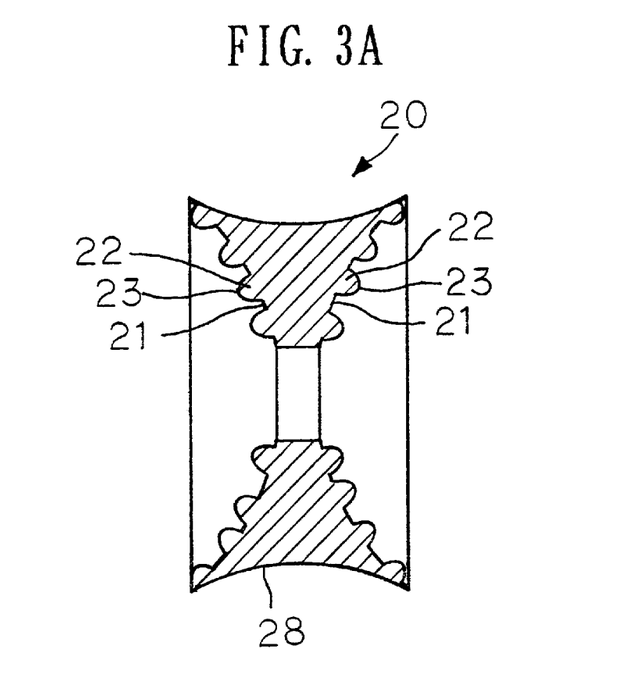
Figure 3B:
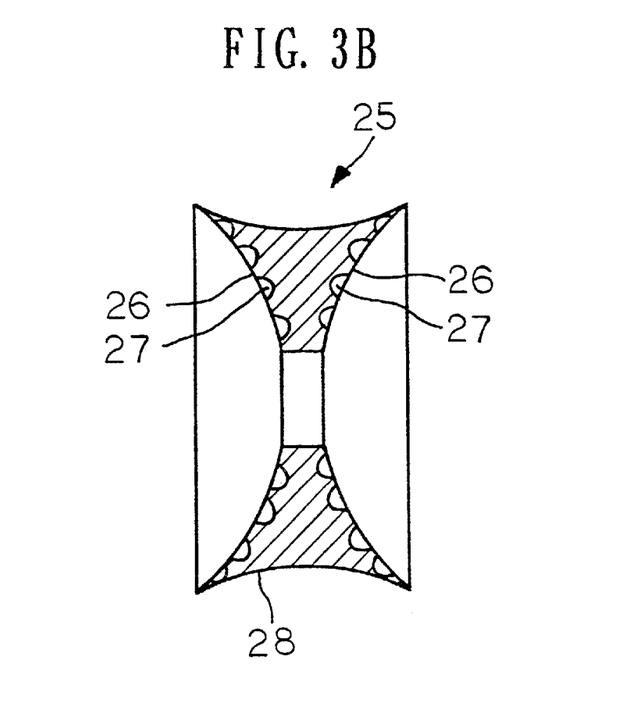

In the embodiments illustrated in FIGS. 1 and 2, the spacers 20 and 25 have cylindrical outer peripheral surfaces 28. However, as shown in FIGS. 3(a) and 3(b) these surfaces can be formed with a concave shape. When both ball rolling grooves are twisted and bent and the ball circulating passage is also bent, interference between the outer peripheral surface 28 with the ball rolling grooves and with the ball circulation passage can occur. Such interference can be prevented effectively by forming the outer peripheral surfaces of the spacers with a concave shape.

The material of the spacers 20 and 25 is preferably a plastics material such as "Duracon®" (a product of Polyplastic Ltd.) However, any oil-impregnated, sintered alloy known as a self-lubricating material can be used. Likewise "Teflon ®" (a product of DuPont Inc.) or the like may be used.

Lubricant-containing plastics as described in Japanese patent publications 3455/1972 and 25480/1981, or porous plastics which can be impregnated with a lubricant, as described in Japanese laid-open patent publication 283634/1986, may also be used.

The ball 10, shown in FIGS. 1 and 2 can be a commercially available steel ball for a ball bearing (JIS B 1501). To suppress heat generation in the ball screw device, the ball may be made of a ceramic material (a silicon nitride ball being preferable for reasons such as strength).

Figure 4:
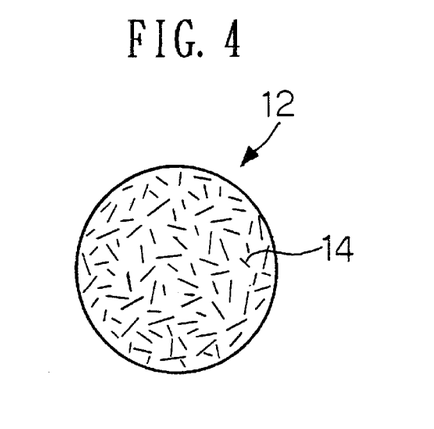
FIG. 4 is an elevational view showing a ball according to another embodiment of the invention.

Another embodiment of a ball is shown in FIG. 4. On the spherical surface of the ball 12 an innumerable number of randomly distributed, minute, needle-like recesses 14 are formed. These recesses are formed by grinding a commercially available steel ball for a ball bearing or the like, using a whetstone having a minute particle size, preferably in the range from #2000 to #6000. Due to the micro EHL effect, an oil film can be easily formed on the spherical surface of the ball 12. By using balls on which these recesses 14 are formed, along with spacers 20 or 25 made from a self-lubricating material, a lubricant-containing plastics material or a lubricant-impregnated plastics material, a ball screw device can be made suitable for use in a special environment such as a clean room, where a lubricant such as grease or oil cannot be used.

The method for inserting balls and spacers into a ball screw device will be explained next. The method is applicable to the above-mentioned conventional ball screw device having spacers as described in Japanese laid-open utility model publication 178659/1988, and is also applicable to modifications in which protrusions 22 are provided on the concave surfaces of the spacers, modifications in which the concave surfaces of the spacers are provided with dimples 27, and modifications utilizing balls 12 with needle-like recesses as in FIG. 4.

Figure 5:
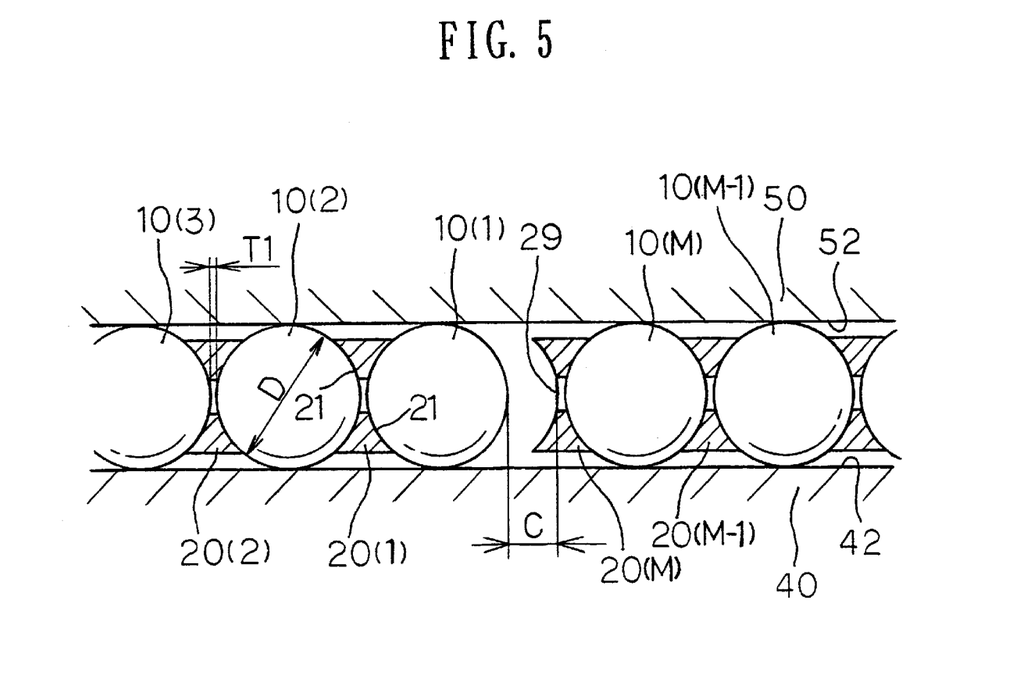
FIG. 5 is a schematic view illustrating the manner of inserting balls and spacers in accordance with the invention.

As shown schematically in FIG. 5, when balls 10, having a diameter D, and spacers 20, having a thickness T1, are inserted between ball rolling grooves 42 and 52 and inside the ball circulating passage (not shown), a clearance C is formed between the vertex of the first-inserted ball 10(1) and the thinnest portion 29 of the last-inserted spacer 20(M).

It may be assumed that M balls 10 and M spacers are inserted into a closed loop consisting of the ball rolling channel formed by grooves 42 and 52 and the ball circulating passage. Symbols in parentheses indicate the sequence of insertion. For example, 10(2) indicates the second inserted ball 10. 20(M) indicates the Mth (last) inserted spacer 20.

The dimension of the clearance C is roughly determined by pulling out the last spacer 20(M), measuring the distance between the vertices of balls 10(1) and 10(M) and deducting the value of the thickness T1 of the spacer 20 from the measured value.

Observations have been made of the relationship between the dimension of clearance C and the behavior of balls 10 and spacers 20 when the screw shaft or ball nut are rotated.

When the revolving speed is uniform at the time that balls 10(1) through 10(M) move and roll, the spacers 20 move in such a way that they are always pushed by the rear balls 10 as the balls move in the advancing direction.

Figure 6:
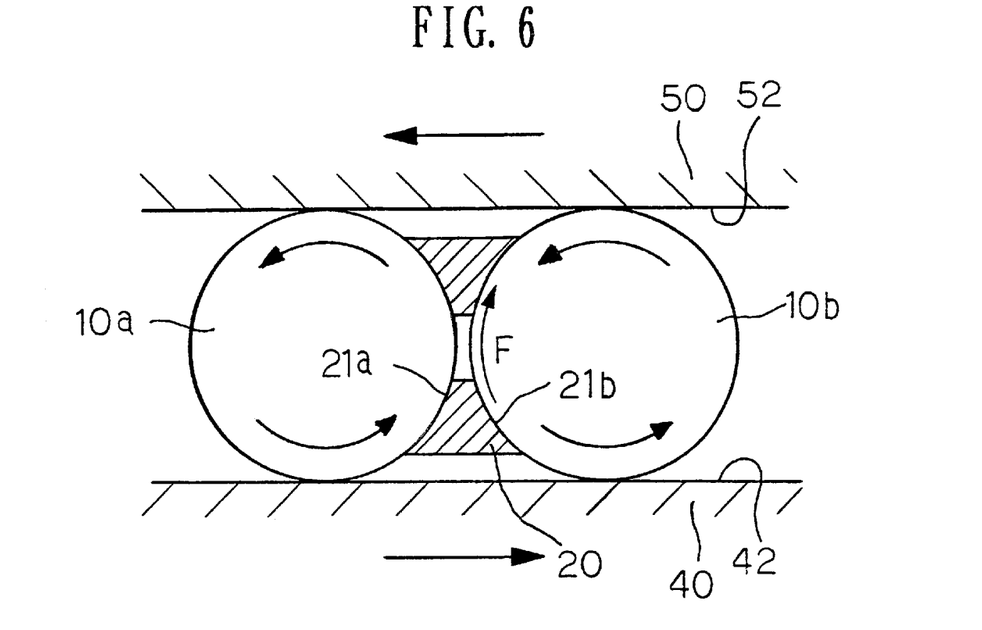
FIG. 6 is a schematic view illustrating the behavior of balls and spacers when the clearance C, shown in FIG. 5, is less than from ⅓ to ½ of the ball diameter.

In the case in which C<(1/3 to 1/2)·D, as shown in FIG. 6, although the rear ball 10b moved and rolled while its spherical surface slid along the concave surface 21b of the spacer 20, the dynamic torque of the ball screw device fluctuated or increased greatly as a result of such sliding. For a sliding resistance F, a resultant force needed in order for the balls 10(1) through 10(M) to roll was increased by an amount F·M. Here there existed a clearance between the front ball 10a and the concave surface 21a of the spacer, but the clearance was so minute that it cannot be shown in the drawing. The sum of these minute clearances, that is the dimension of one such clearance multiplied by M (the number of balls or spacers) becomes the dimension of the clearance C between the vertex of the first-inserted ball 10(1) and the thinnest portion of the last-inserted spacer.

Figure 7:
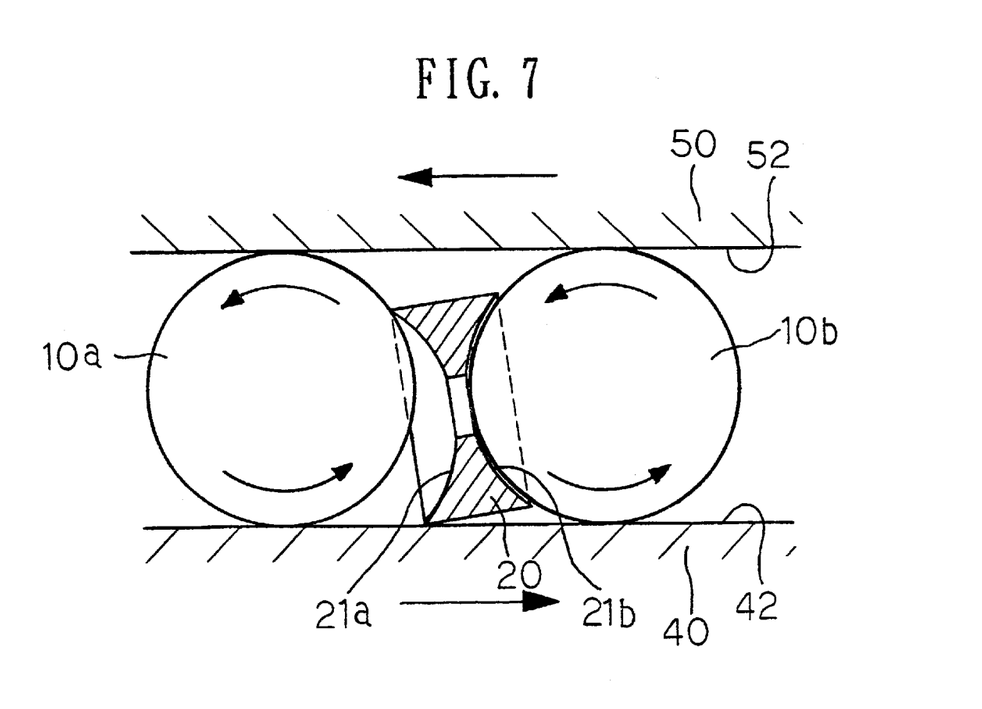
FIG. 7 is a schematic view illustrating the behavior of balls and spacers when the clearance C, shown in FIG. 5, is greater than ¾ of the ball diameter.

In the case in which $C>\frac{3}{4}\cdot D$, as shown in FIG. 7, the distance between the front and rear balls, that is neighboring balls $10a$ and $10b$ became too large to hold the spacer 20. Consequently, the spacer 20 is tilted or turned down and obstructed circulation of the balls. There was a case in which the concave surface $21b$ of the turned-down spacer 20 was stepped on by the ball $10b$ which moved and rolled toward the spacer from behind.

In the case in which $\frac{1}{2}\cdot D<C<\frac{3}{4}\cdot D$, the spacer 20 turned down sometimes but not at other the times.

Figure 8:
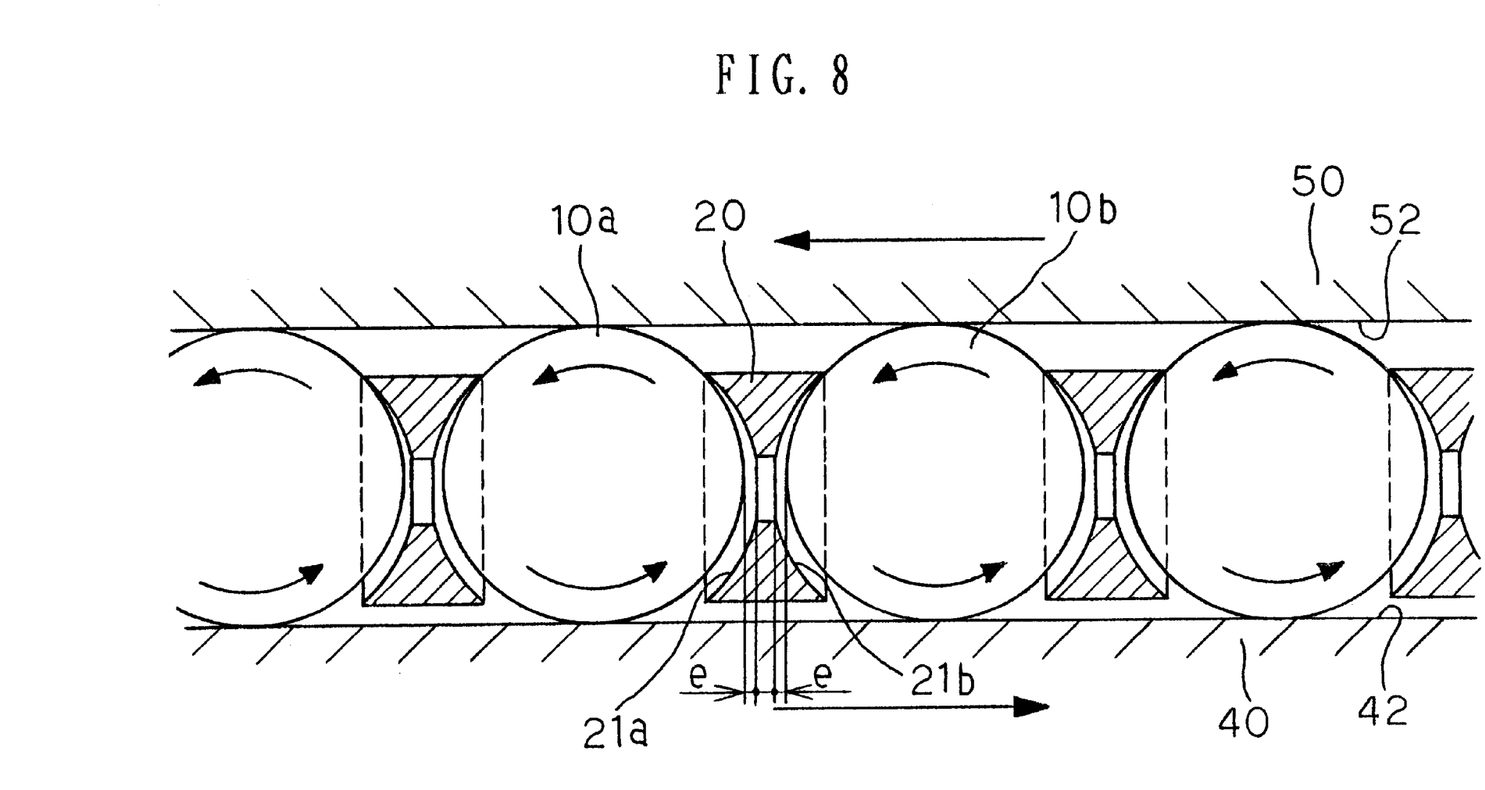
FIG. 8 is a schematic view illustrating the behavior of balls and spacers when the clearance C, shown in FIG. 5, is with the range of ⅓ to ½ of the ball diameter.

In the case in which $C=(\frac{1}{3}$ to $\frac{1}{2})\cdot D$, as shown in FIG. 8, the respective spherical surfaces of the front and rear balls, that is neighboring balls $10a$ and $10b$, came into contact with the radial end portions of the concave surfaces $21a$ and $21b$ of the spacer 20, so that the spacer was retained, while clearances e were simultaneously maintained between the spherical surfaces of the balls $10a$ and $10b$ and the concave surfaces $21a$ and $21b$ of the spacers. There was neither fluctuation nor increase in dynamic torque in the ball screw device, and consequently the balls and spacers circulated smoothly. Here, the sum of the clearances e becomes the clearance C between the vertex of the first-inserted ball 10(1) and the thinnest part of the last-inserted spacer 20(M).

From the above results, it was found that the most favorable result is obtained when the clearance C between the vertex of the first-inserted ball 10(1) and the thinnest portion of the last-inserted spacer is set to $(\frac{1}{3}$ to $\frac{1}{2})\cdot D$.

On the other hand, to obtain a ball screw device having a large load capacity and rigidity, it is preferable to use only spacers having a thickness T1 and to insert as many balls 10 as possible. However, as mentioned previously, even when ball screw devices have the same nominal model numbers, machining errors result in variations in the effective diameters of the ball rolling grooves, differences in ball diameters and irregularities in the total length of the ball rolling channel and ball circulation passage. Accordingly, when only spacers having a thickness T1 are used, the likelihood that the dimension of clearance C will fall within the range of $(\frac{1}{3}$ to $\frac{1}{2})\cdot D$ is approximately 10%. Therefore, it will ordinarily be necessary to utilize spacers having a larger thickness T2 in combination with the spacers having a thickness T1.

The number of spacers having a thickness T2 needed to obtain a clearance C in the range of $(\frac{1}{3}$ to $\frac{1}{2})\cdot D$ may be determined as follows.

In the case that the spacers having a thickness T2 are used in combination with spacers having a thickness T1, when the inserted number of balls is N, n1 is the number of spacers having a thickness T1, n2 is the number of spacers having a thickness T2, and L is the sum of the length of the ball rolling channel comprising grooves 42 and 52 and the length of the ball circulating channel, the following relationships must be satisfied:

$$L=D\cdot N+T1\cdot n1+T2\cdot n2+(\tfrac{1}{3} \text{ to } \tfrac{1}{2})\cdot D$$

and $$N=n1+n2.$$

First, the balls 10 having a diameter D and spacers 20 having a thickness T1 are inserted in the ball rolling channel and ball circulating passage alternately with no clearance between successive elements. Thereafter, the dimension of the clearance C between the vertex of the first-inserted ball and the thinnest portion of the last-inserted spacer is measured. Then, n2 is obtained in the following manner:

In the case of $(\tfrac{1}{3} \text{ to } \tfrac{1}{2})\cdot D<C$, $n2=(C-(\tfrac{1}{3} \text{ to } \tfrac{1}{2})\cdot D)/(T2-T1)$ n2 is the integer value of the number obtained from the above formula. Then, n2 spacers having a thickness T1 are removed and replaced by an equal number of spacers having a thickness T2. Here, the inserted number of balls 10 is set N=M, and the inserted number of spacers 20 having a thickness T1 becomes n1, which is equal to M−n2.

In the case in which $C<(\tfrac{1}{3} \text{ to } \tfrac{1}{2})\cdot D$, after taking out the ball 10(M) and the spacer 20(M), the latter having a thickness T1, n2 is determined from the following formula, again using the integer value only.

$$n2=((C+D+T1)-(\tfrac{1}{3} \text{ to } \tfrac{1}{2})\cdot D)/(T2-T1)$$

Then n2 spacers of thickness T1 are removed and replaced by an equal number of spacers of thickness T2. Here, the inserted number of balls N=M−1, and the inserted number of spacers of thickness T1 becomes n1=(M−1)−n2.

The spacers having a thickness T1 and the spacers having a thickness T2 are arranged in a random manner. However, it is possible to arrange the spacers having a thickness T1 in a fixed pattern. For example they may be disposed at a given interval with spacers having a thickness T2 interposed between them.

The ball screw device obtained by the above method has the following advantageous effects.

First, when the screw shaft 40 or the ball nut 50 is rotated, the respective spherical surfaces of the neighboring balls $10a$ and $10b$ come into contact with the radially outer portions of the concave surfaces $21a$ and $21b$ of the spacers, so that the spacers are retained, while at the same time clearances e are maintained between the spherical surfaces of the balls and the concave surfaces of the spacers, as shown in FIG. 8. With these clearances maintained, neither fluctuations nor increases in dynamic torque occur, and the balls are circulated smoothly. When a lubricant such as grease or oil fills the ball rolling grooves, the clearances e form oil pockets for the lubricant, enhancing the lubricant holding ability of the device and increasing the intervals between maintenance operations. The same advantages, of course, can be realized in the case where only spacers having a thickness T1 are used if the dimension of the clearance C is $(\tfrac{1}{3}$ to $\tfrac{1}{2})\cdot D$.

It has been confirmed that, if a clearance C of $(\tfrac{1}{3}$ to $\tfrac{1}{2})\cdot D$ is achieved with the insertion of n1 spacers of thickness T1 and n2 spacers of thickness T2, or with M spacers of thickness T1, the number of balls can be approximately 2–4 below the fully loaded number of balls. This can be expressed by the formula:

$$T1\cdot n1+T2\cdot n2+(\tfrac{1}{3} \text{ to } \tfrac{1}{2})\cdot D\approx(2 \text{ to } 4)\cdot D$$

or $$T1\cdot M+(\tfrac{1}{3} \text{ to } \tfrac{1}{2})\cdot D\approx(2 \text{ to } 4)\cdot D$$

Accordingly a ball screw device can be achieved that has approximately the same load capacity and rigidity as the load capacity and rigidity of a conventional "all ball" screw device in which the number of inserted balls is from 2 to 4 less than the fully loaded number of balls.

By way of example, using a model 28TFJ10 ball screw unit made by Tsubaki Nakashima Co. Ltd. and described in its May 1, 1996 general catalog at pages A-34 to A-35, the diameter of the balls 10 was 3/16 inch (4.763 mm) and the dimensions of the spacers were S=3.4 mm, U=1.4 mm (common dimensions), T1=0.2 mm and T2=0.4 mm. (See FIG. 1). 62 balls, 55 spacers having a thickness T1 and 7 spacers having a thickness T2 were inserted into one closed loop consisting of the ball rolling channel and the ball circulating passage.

The decreased number of balls 10 (below a fully loaded condition) resulting from the insertion of the spacers and forming a clearance of (1/3 to 1/2)·D became (0.2×55+0.4×7+(1/3 to 1/2)×4.763)/4.763=3.2 to 3.4

This embodiment is effective when the balls revolve at uniform speed. However, there existed a slight difference in the revolving speeds of the balls, when the balls rolled and moved, due to a non-uniformity of the shapes of the ball rolling grooves or the like, giving rise to the drawbacks mentioned previously.

The spacers according to the invention avoid these drawbacks. The manner of their operation is explained below.

Figure 9:
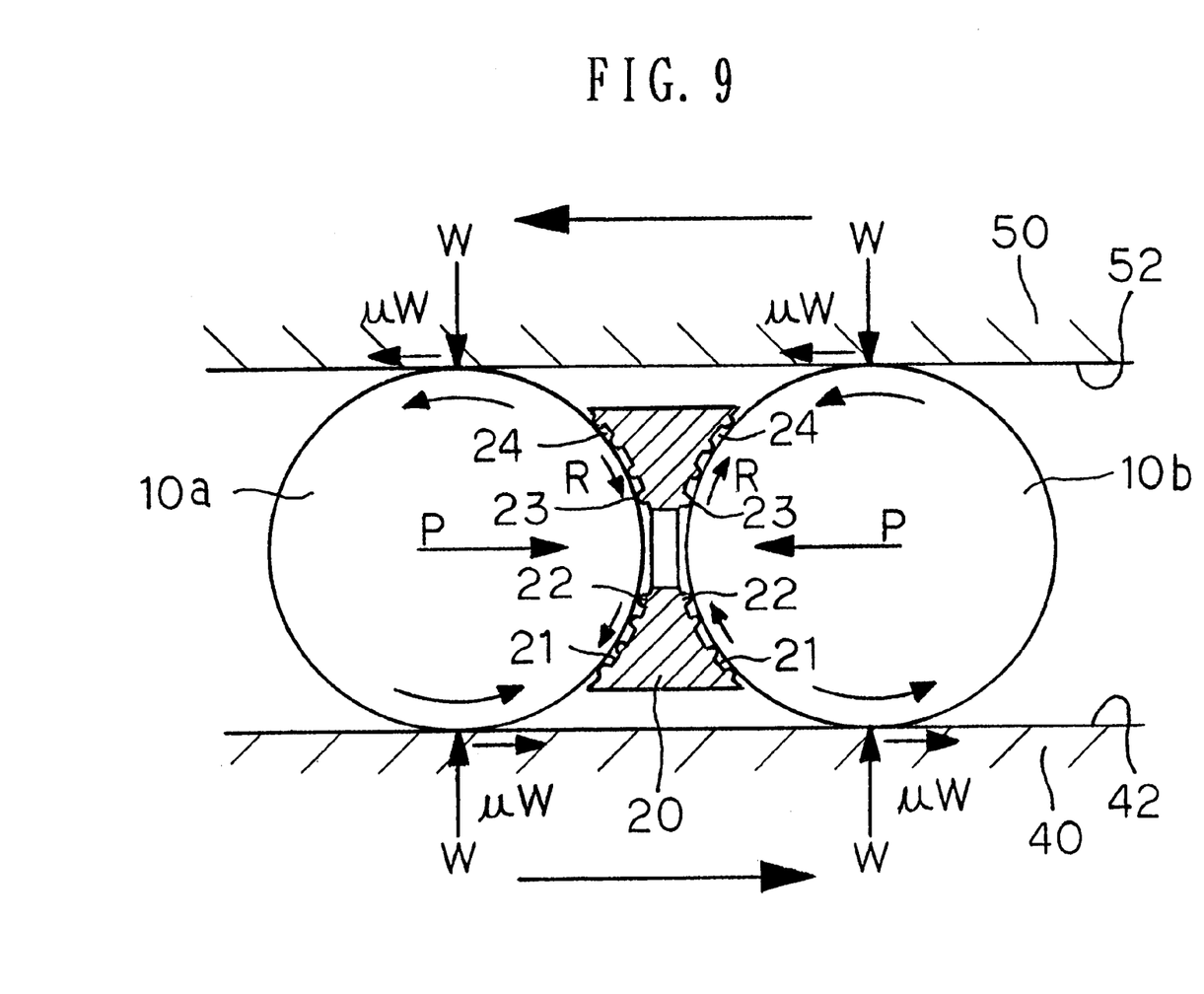
FIG. 9 is a schematic view illustrating the operation of the spacer of FIG. 1.

As shown in FIG. 9, when the revolving speed of the rear ball 10$b$ is greater than the revolving speed of the front ball 10$a$, the balls 10$a$ and 10$b$ jostle each other by way of the spacer 20, and sandwiching forces P act on the concave surfaces of the spacer. However, since a plurality of protrusions 22 are formed and distributed on the concave surfaces of the spacer, the spherical surfaces of the balls 10 and 10$b$ come into point contact with the protruding ends 23 of the protrusions 22. Accordingly, the sum of the areas where the spherical surfaces of the balls come into point contact with the protruding ends 23 can be made extremely small so that the resistances R, which obstruct the rolling of the balls, can be made small.

Accordingly, fluctuations and increase in the dynamic torque of the ball screw device can be prevented. Furthermore, even when the ball screw device is subjected to low speed or tilting movements, the remarkable increase in the dynamic torques is avoided, and the ball clogging phenomenon is prevented. When a lubricant such as grease or oil fills the ball rolling grooves 42 and 52, the spaces 24 which are formed between the protrusions function as oil pockets of the lubricant, preventing the oil film formed on the surfaces of he balls from being interrupted, and wear of the balls and ball rolling grooves due to point contact of the balls with the surfaces of the grooves is effectively prevented.

By applying a preload W between the balls and the ball rolling grooves, with the use of a oversize balls or the like, a frictional force $\mu W$ ($\mu$ being a friction coefficient) caused by the preload W is added to the force necessary to roll the balls, and hence the balls can roll more easily.

When the spacers 25, which constitute the spacers of the second embodiment are used, since a plurality of dimples 27 are formed in, and distributed on, the concave surfaces of the spacers, the spherical surfaces of the balls come into contact with small areas of the concave surfaces. Accordingly, resistances R, which obstruct the rolling of the balls are reduced to a small level. The dimples function as oil pockets and achieve an advantageous effect similar to that achieved by the spaces between protrusions in the first embodiment.

In either of the first two embodiments, a ball having needle-like recesses, as shown in FIG. 4, can be used.

As described above, according to the invention, at the time of insertion of the balls and spacers, a dimension of a clearance between the vertex of a first-inserted ball and the thinnest part of a last-inserted spacer is set to 1/3 to 1/2 of the ball diameter. This gives rise to the following advantages.

When the screw shaft or ball nut is rotated, if the revolving speeds of the balls are uniform at the time that they move and roll, the spacers are held so that the spherical surfaces of the neighboring balls and the radially outward portions of the concave surfaces of the spacers are brought into contact with each other while clearances are maintained between the spherical surfaces of the balls and the concave surfaces of the spacers so that fluctuations and increases in dynamic torque are prevented and smooth circulation of the balls and spacers is ensured.

When a lubricant (grease or oil) fills the space between the ball rolling grooves, clearances defined between the spherical surfaces of the balls and the concave surfaces of the spacers form oil pockets enhancing the retention of lubricant. Thus, the ball screw device can be operated for long intervals without maintenance.

By disposing spacers between the balls which set the clearance between balls to a dimension in the range from 1/2 to 1/3 of the ball diameter the number of balls can be within the range of 2 to 4 balls less than the full number of balls that can be loaded. Consequently, the ball screw device of the invention can achieve a load capacity and rigidity similar to those of an "all ball" device.

The protrusions and dimples formed on the concave surfaces of the spacers give rise to the following further advantages.

Even when both concave surfaces of the spacer are brought into close contact with the spherical surfaces of the balls, and the spacers are sandwiched between balls revolving at different speeds, the resistances that obstruct the rolling of the balls is relatively small, and consequently the dynamic torque neither fluctuates nor increases. By applying a preload between the balls and both ball rolling grooves, a frictional force generated by the preload is added to the force needed to roll the balls, and hence the balls can roll more easily.

Even when the ball screw device is subjected to low speed movement or oscillatory movement, it is possible to prevent the remarkable increase in dynamic torque and to avoid the resulting ball clogging phenomenon.

When the ball rolling grooves are filled with a lubricant, the spaces defined between the protrusions, or, in the case of dimples, the dimples themselves, function as oil pockets for the lubricant. Hence, the formation of oil films on the spherical surfaces of the balls is not interrupted, and wear of the balls and the ball rolling grooves caused by point contact between the balls and the grooves, can be prevented. Accordingly a ball screw device having a longer lifetime than that of a conventional ball screw device can be obtained.

Since the spacers are not connected to one another, and each spacer is disposed between independent neighboring balls, the following advantages are realized.

Since the balls to not come into contact with each other, the invention avoids wear and the generation of noise which occur in conventional "all ball" or "spacer ball" devices as a result of contact between adjacent balls.

The invention obviates the extra machining steps needed for example to form recessed guide grooves in the ball circulating passage in strip retainer or ball chain devices. Accordingly, the ball screw device can flexibly cope with individual products including conventional products.

What is claimed is:

1. A ball screw device comprising:
a screw shaft having an outer peripheral surface and a spiral ball rolling groove on said outer peripheral surface;

a ball nut having an inner peripheral surface and a spiral ball rolling groove on said inner peripheral surface, the ball rolling groove of the ball nut facing and being opposed to the ball rolling groove of the screw shaft, whereby the ball rolling grooves together form a spiral ball rolling channel having first and second ends;

a ball circulating passage connecting said ends of the ball rolling channel;

a plurality of balls in the ball rolling channel and in the ball circulating passage, each of the balls having a spherical outer surface and a ball diameter D; and spacers disposed between the balls, there being one of said spacers between the balls of each pair of adjacent balls in the ball circulating passage and ball rolling channel, each of the spacers having spherical concave end surfaces facing in opposite directions on an axis about which the concave surfaces are symmetrical, said concave end surfaces of each spacer, receiving and slidably fitting portions of the spherical outer surfaces of two adjacent balls of said plurality of balls, respectively;

wherein each of said spacers has a thickness from the group consisting of a first thickness T1 and a second, and different, thickness T2, the thickness T2 being related to the thickness T1 by the formula T2=T1+D/k, where D is the ball diameter, and k is a constant, and the spacers include at least one spacer of each said thickness; and wherein the number of spacers having a thickness T1 and the number of spacers having a thickness T2 is such that the sum C of the clearances e between the balls and the spacers is in the range from $\frac{1}{3}$ to $\frac{1}{2}$ of the ball diameter D;

whereby large dynamic torque increases and fluctuations are prevented, using spacers having only two different thicknesses.

2. A ball screw according to claim 1, wherein the discontinuities are constituted by a plurality of protrusions formed on the concave surfaces of said spacers, the protrusions on the concave surface of each spacer being distributed and having ends complementary to the spherical outer surface of the ball received therein.

3. A ball screw device according to claim 1, wherein the discontinuities are constituted by a plurality of dimples formed in the concave surfaces of said spacers, the dimples in the concave surface of each spacer being distributed.

4. A ball screw device according to claim 1, wherein a preload is applied between said balls and the ball rolling grooves.

5. A ball screw device according to claim 1, wherein said spacers have a circular periphery, and the diameter of said spacers is in the range of 60% to 80% of the diameter of the balls.

6. A ball screw device according to claim 1, wherein said spacers are made of a self-lubricating material, a plastics material containing a lubricant or a plastics material impregnated with a lubricant.

7. A ball screw device according to claim 1, wherein said balls have minute, needle-like recesses formed in, and randomly distributed on, their spherical outer surfaces.

8. A ball screw device according to claim 1, wherein the concave surfaces of the spacers have discontinuities constituted by a plurality of protrusions formed on the concave surfaces of said spacers, the protrusions on the concave surface of each spacer being distributed and having ends complementary to the spherical outer surface of the ball received therein, or dimples formed in the concave surfaces of said spacers, the dimples in the concave surface of each spacer being distributed.

9. A ball screw device according to claim 1, in which the thickness T1 is in the range of 0.2 to 0.5 mm.

* * * * *

UNITED STATES PATENT AND TRADEMARK OFFICE
CERTIFICATE OF CORRECTION

PATENT NO.    : 6,415,676 B1
DATED         : July 9, 2002
INVENTOR(S)   : H. Takagi et al.

It is certified that error appears in the above-identified patent and that said Letters Patent is hereby corrected as shown below:

<u>Title page,</u>
Item [75], Inventors, change "Hirouyki Takagi" to -- Hiroyuki Takagi --

Signed and Sealed this

Thirty-first Day of December, 2002

JAMES E. ROGAN
*Director of the United States Patent and Trademark Office*